United States Patent
Ritter et al.

(10) Patent No.: US 10,657,450 B2
(45) Date of Patent: May 19, 2020

(54) SYSTEMS AND METHODS FOR MACHINE DIAGNOSTICS BASED ON STORED MACHINE DATA AND AVAILABLE MACHINE TELEMATIC DATA

(71) Applicant: Deere & Company, Moline, IL (US)

(72) Inventors: Curtis P. Ritter, Waterloo, IA (US);
Joseph A. Bell, Fairbank, IA (US);
Ronald J. Marrah, Waterloo, IA (US);
Matthew J. Pipho, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 1143 days.

(21) Appl. No.: 14/870,685

(22) Filed: Sep. 30, 2015

(65) Prior Publication Data

US 2017/0091634 A1   Mar. 30, 2017

(51) Int. Cl.
| | | |
|---|---|---|
| G06N 5/04 | (2006.01) | |
| G06Q 10/00 | (2012.01) | |
| G06F 11/00 | (2006.01) | |
| G07C 3/00 | (2006.01) | |
| G05B 23/02 | (2006.01) | |

(52) U.S. Cl.
CPC ......... *G06N 5/045* (2013.01); *G05B 23/0262* (2013.01); *G06F 11/00* (2013.01); *G06Q 10/20* (2013.01); *G07C 3/00* (2013.01)

(58) Field of Classification Search
CPC ..... G06N 5/045; G05B 23/0205; G06F 11/00; G06Q 10/20; G07C 3/00
See application file for complete search history.

(56) References Cited

U.S. PATENT DOCUMENTS

| | | |
|---|---|---|
| 8,374,745 B2 | 2/2013 | Zhang et al. |
| 2002/0183866 A1 | 12/2002 | Dean et al. |
| 2003/0195675 A1* | 10/2003 | Felke ................. G05B 23/0278 701/29.3 |
| 2010/0063668 A1* | 3/2010 | Zhang .................... G06Q 10/04 701/29.5 |

(Continued)

FOREIGN PATENT DOCUMENTS

| | | |
|---|---|---|
| EP | 2251835 | 11/2010 |
| WO | 2012001653 | 1/2012 |
| WO | 2013127958 | 9/2013 |

OTHER PUBLICATIONS

Hanemann, "A Hybrid Rule-Based/Case-Based Reasoning Approach for Service Fault Diagnosis" article (2006) 5 pages.

(Continued)

*Primary Examiner* — Alexey Shmatov
*Assistant Examiner* — Robert Bejcek, II
(74) *Attorney, Agent, or Firm* — Michael Best & Friedrich LLP

(57) ABSTRACT

A computer-based system and method for developing an optimized step-by-step procedure for servicing a monitored machine using case-based reasoning based on an analysis of stored machine specifications (including warranty information) and using other rules based on an analysis of sensor data received through a telematics system from sensors equipped on the machine. The system generates an optimized service procedure based on previously collected and real time information to enable service to be performed more efficiently.

21 Claims, 9 Drawing Sheets

(56) References Cited

U.S. PATENT DOCUMENTS

2012/0145778 A1* 6/2012 Cong .................... G16H 10/40
                                                                235/375
2013/0030765 A1    1/2013 David
2015/0066286 A1    3/2015 Connolly et al.

OTHER PUBLICATIONS

EP16190360.4 Extended European Search Report dated Dec. 19, 2016 (9 pages).

* cited by examiner

SYSTEMS AND METHODS FOR MACHINE DIAGNOSTICS BASED ON STORED MACHINE DATA AND AVAILABLE MACHINE TELEMATIC DATA

BACKGROUND

The present disclosure relates to tools, methods, and systems used to monitor, diagnose, and repair machines.

SUMMARY

Significant time is spent by technicians troubleshooting problems with complex machines and systems such as machines that include diesel engines. To ensure consistent analysis, the procedures that the technician follows may include a defined listing of static steps with the results of tests directing them to other steps in the procedure. To make the troubleshooting process more efficient and to help identify problems more quickly, systems apply case-based reasoning techniques to prioritize troubleshooting procedures and to reorder or add steps with the greatest chance for successfully resolving a problem. In some implementations, a case-based reasoning system can be configured to adapt and refine troubleshooting procedures for a technician visit based on known data stored in a centralized database and/or server. This information can include, for example, warranty information for each specific machine.

To further improve the efficiency of troubleshooting procedures and technician service, the "case-based reasoning" system can be augmented or supplemented by systems and methods that consider a variety of additional data sources and "rules" to determine the priority of troubleshooting steps. In some implementations, this data may be collected wirelessly through vehicle sensors and transmitted to a service center where it is used by an automated planning system server to develop a prioritized troubleshooting procedure for the technician before visiting the site of the machine in question. Furthermore, in some implementations, the functionality of the automated planning system server is made available to technicians during site-visits in online, internet-connection, or offline configurations. Because not all machines may be equipped with certain sensors or wireless communication functionality, the automated planning system server can be configured to also adjust the sequence of steps based on the availability of data sources and specific machine features.

In one embodiment, the disclosure provides a machine diagnostics system used for monitoring and servicing a machine. The machine includes a machine telematics system. The machine diagnostics system includes a communication transceiver configured to receive from the machine telematics system sensor data recorded during routine operation of a first machine of a plurality of monitored machines by sensors equipped on the first machine. The communication transceiver is also configured to receive an indication of a service issue for the first machine of the plurality of machines. The machine diagnostics system also includes a non-transitory computer-readable memory configured to store machine information for the plurality of monitored machines. The machine information includes hardware configuration information, area of use information, and historical service information for each of the plurality of machines. The non-transitory computer-readable medium is also configured to store the received sensor data from the first machine. The machine diagnostics system further includes an automated planning system server coupled to the non-transitory computer-readable memory and the communication transceiver. The automated planning system server is configured to automatically analyze the stored sensor data for the first machine, automatically generate a list of identified conditions for the first machine based on the analysis of the sensor data for the first machine, and automatically generate an ordered list of diagnostic procedures to be performed during a servicing of the first machine to address the indicated service issue. The ordered list is optimized to address the indicated service issue based on the stored machine information for the first machine and the identified conditions of the first machine based on the analysis of the sensor data of the first machine. The automated planning system server is configured to generate a first ordered list of diagnostic procedures when a first list of identified conditions is generated, and generate a second ordered list of diagnostic procedures, that is different from the first ordered list of diagnostic procedures, when a second list of identified conditions, that is different from the first list of identified conditions, is generated.

In another embodiment, the disclosure provides a method of monitoring and servicing a machine using a machine telematics system. The method includes storing, on a non-transitory computer-readable memory, machine information for a plurality of monitored machines. The machine information includes hardware configuration information, area of use information, and historical service information for each of the plurality of machines. The method also includes receiving, by an automated planning system server from machine telematics systems equipped on one or more individual machines of the plurality of machines, sensor data recorded during routine operation of the one or more individual machines by sensors equipped on the one or more individual machines, storing the received sensor data on the non-transitory computer-readable memory, and receiving, by an automated planning system server, an indication of a service issue for a first machine of the plurality of machines. The method further includes automatically analyzing, by the automated planning system server, the sensor data for the first machine stored on the non-transitory computer-readable memory, automatically generating, by the automated planning system server, a list of any identified conditions for the first machine based on the analysis of the sensor data for the first machine, and automatically generating, by the automated planning system server, an ordered list of diagnostic procedures to be performed during a servicing of the machine to address the indicated service issue. The ordered list is optimized to address the indicated service issue based on the stored machine information for the first machine and the identified conditions of the first machine based on the analysis of the sensor data for the first machine. The automated planning system server generating a first ordered list of diagnostic procedures when a first list of identified conditions is generated, and generating a second ordered list of diagnostic procedures, that is different from the first ordered list of diagnostic procedures, when a second list of identified conditions, that is different from the first list of identified conditions, is generated.

In another embodiment, the disclosure provides a machine diagnostics system used for monitoring and servicing a machine using a machine telematics system. The machine diagnostics system includes a communication transceiver. The communication transceiver is configured to receive from the machine telematics system sensor data recorded during routine operation and receive an indication of a service issue for the first machine. The machine diagnostics system includes a non-transitory computer-readable medium configured to store warranty for information for each of the plurality of monitored machines, owner information for each of the plurality of monitored machines, and machine build data for each of the plurality of monitored machines. The build data may include information regarding model numbers for a plurality of components of each machine. The automated planning system server is configured to automatically analyze the sensor data for the first machine and automatically generate a list of identified conditions for the first machine based on the owner information, the warranty information, the machine build data, and the analysis of the sensor data for the first machine. The automated planning system server is also configured to automatically generate an ordered list of diagnostic procedures to be performed during a servicing of the machine to address the indicated service issue. The ordered list is optimized to address the indicated service issue based on the stored machine information and the identified conditions of the first machine based on the owner information, the warranty information, the machine build data, and the analysis of the sensor data for the first machine.

Other aspects will become apparent by consideration of the detailed description and accompanying drawings.

DETAILED DESCRIPTION

Figure 1:
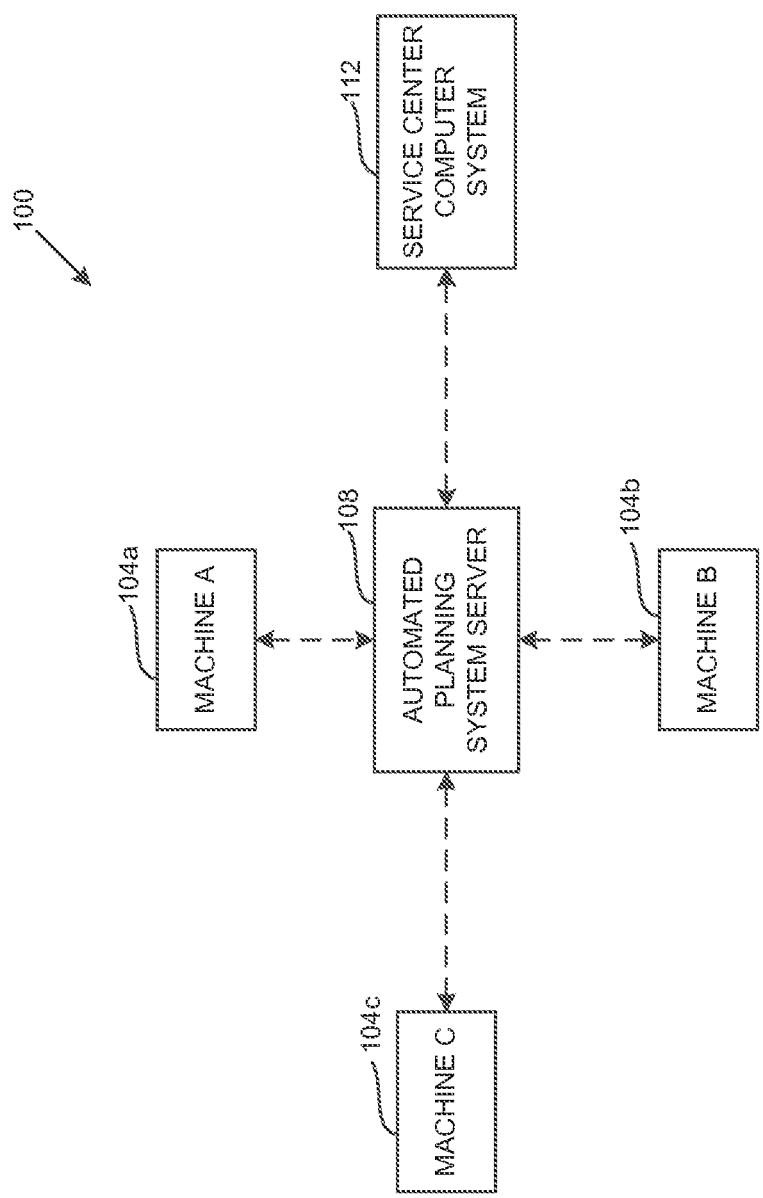
FIG. 1 is a block diagram of a machine diagnostics system for monitoring and servicing a plurality of machines.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor," "central processing unit," and "CPU" are interchangeable unless otherwise stated. Where the terms "processor," or "central processing unit," or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

Figure 2:
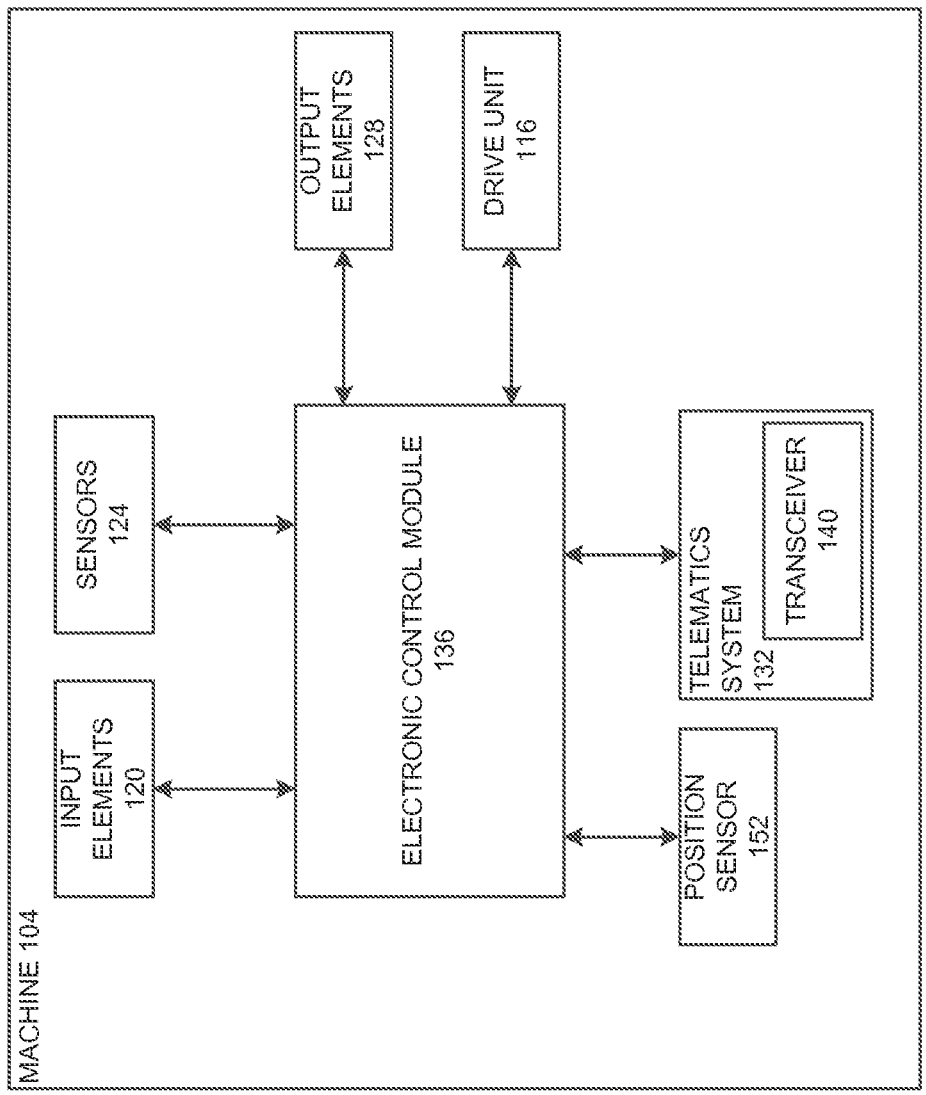
FIG. 2 is a schematic of a control system for a machine monitored and serviced by the system of FIG. 1.

FIG. 1 illustrates a machine diagnostics system 100. As shown in FIG. 1, a plurality of machines 104 communicate with an automated planning system server 108, which also communicates with at least one service center computer system 112. The machine diagnostics system 100 monitors information obtained from various sources regarding each of the machines 104. For example, the machine diagnostics system 100 may obtain information directly from the machines 104, from a manufacturer associated with the machines 104, and/or from the service center computer system 112. The machine diagnostics system 100 uses the gathered information about the machines 104 to optimize the operation, maintenance, and repair of the machines 104. For example, the machine diagnostics system 100 allows the automated planning system server 108 to monitor information about the machines 104 and alert the service center computer system 112 when a service issue associated with one of the machines 104 is detected by the automated planning system server 108. The service center computer system 112 may notify a technician about the issue and then proactively schedule or initiate preventative maintenance on the machine 104 before the machine 104 encounters a more serious service issue. The machines 104 can be different types of machines, each being configured to perform a specific task (e.g., digging, harvesting, mowing, spraying, etc.). For example, the machines 104 may include vehicles such as shovels, tractors, box drills, planters, harvesters, scrapers, sprayers, cutters, shredders, bailers, etc. The machines 104 can also or alternatively include other equipment that is not considered a vehicle. For example, the machines 104 can include power tools, air compressors, grinders, etc. FIG. 2 schematically illustrates control system components for one example of a machine 104 that is monitored and serviced by the machine diagnostics system 100. The machine 104 in the example of FIG. 2 includes a drive unit 116, input elements 120 for controlling the drive unit 116, sensors 124 for monitoring parameters of the drive unit 116, output elements 128 for informing and/or instructing the user, a telematics system 132, a position sensor unit 134, and an electronic control module 136

As shown in FIG. 2, the components of the machine 104 communicate with the electronic control module 136. The electronic control module 136 manages and controls the interactions between the components of the machine 104. The drive unit 116 generates energy for the machine 104 to perform the specific task. For example, in various vehicles the drive unit 116 can be an internal combustion engine driving the vehicles forward, or the drive unit can be a specific motor driving a component of the vehicle (e.g., a motor driving a variable speed pump in a sprayer). The drive unit 116 generates the energy according to control signals received from the electronic control module 136.

The drive unit 116 is also controlled by various input elements 120 of the machine 104. The input elements 120 allow the user to interact with the machine 104 and control various aspects of the machine 104 operation. For example, through various user inputs, a particular machine 104 controls the drive unit 116 to provide only a certain amount of force, and/or to change the direction of the force generated by the drive unit 116. The input elements 120 may also control additional or different functions of the machine 104.

The machine 104 also includes various sensors configured to detect and measure various parameters of the machine 104. The specific measurements and/or data collected by the sensors 124 are specific to each type of machine 104 and each use of the machine 104. The sensors 124 communicate periodically with the electronic control module 136 to transmit the measured quantity to the electronic control module 136. The electronic control module 136 may discard the output received from the sensor 124, store the output received from the sensor 124, and/or perform analysis based on the output from the sensor 124 to gain a better understanding of the machine operation.

The position sensor unit 134 communicates with the electronic control module 136 to indicate the geographical position of the machine 104. In some embodiments, the position sensor unit 134 includes a GPS unit that communicates with external satellites to determine the location of the machine 104. In other embodiments, the position sensor can include other types of position sensors.

The electronic control module 136 is also coupled to various output elements 128. These output elements 128 further increase user interaction and increase the amount of information that is readily available to the user of the machine 104. The output elements 128 can also vary by machine 104 and may include, among other things, light indicators, speakers, a screen to display textual messages, and the like.

In the example of FIG. 2, the machine 104 also includes a machine telematics system 132. The machine telematics system 132, as shown in FIG. 2, includes a wireless transceiver 140 and is configured to communicate with a remote device, such as, for example, the automated planning system server 108 of FIG. 1, regarding various aspects of the machine 104. In particular, the machine telematics system 132 communicates sensor data and position data from the machine 104 to the automated planning system server 108.

The electronic control module 136 receives sensor outputs from the sensors 124, receives user inputs through the input elements 120, outputs control signals to the drive unit 116 and the output elements 128, and exchanges data with an external device via the machine telematics system 132.

In some embodiments, the electronic control module 136 analyzes the sensor output data and determines a list of active fault codes associated with the machine 104. The machine telematics system 132 can then output the active fault codes to the automated planning system server 108 to expedite the diagnosis and repair process. In other embodiments, the machine telematics system 132 outputs the sensor data to the automated planning system server 108 and the automated planning system server 108 determines the list of active fault codes. In yet other embodiments, such as the illustrated embodiment, some of the active fault codes are determined by the electronic control module 136 and some of the active fault codes are determined by the automated planning system server 108.

As shown in FIG. 1, the service center computer system 112 communicates with the automated planning system server 108. The service center computer system 112 is located at a service center for the machines 104. The service center provides various services to the machines 104, and may sometimes use information obtained from the automated planning system server 108 to enhance the services provided to the machines 104. Some of the services provided by the service center include general maintenance and non-emergency service calls, while other services may need to be performed fast to prevent damage to the machines 104.

In some implementations, the service center computer system 112 includes a network of computers located throughout the service center and a local database for storing information related to the services provided to each machine 104. The service center computer system 112 communicates with the automated planning system server 108 through an Internet connection (or another public or private, wired or wireless data communication network). When technicians perform services on a machine 104, the technicians record, on one of the networked computers, specific information about the service provided to the machine 104. For example, the technicians may record date of service, service issue resolved, manner in which the service issue was resolved, whether the service needs to be performed periodically as is the case with maintenance service, parts used to resolve the service issue, time necessary to resolve the service issue, steps taken before service issue was resolved (e.g., if other parts or components were checked before determining the root cause of a service issue), etc. In this context, this type of information regarding the service provided to the machine 104 is referred to as field service data. Accordingly, when referring to field service data, reference is made to some or all of the information listed above as well as other information relevant to the service issue, the service provided, and the service result. The database may also include identifying information for the machine 104 such as the type of machine, any serial and/or model numbers associated with the machine 104, a user associated with the machine 104 (e.g., an owner or manager), and contact information for the user.

The service center computer system 112 provides field service data to the automated planning system server 108 through the Internet connection. The field service data, once provided to the automated planning system server 108, can be incorporated into new procedures for addressing a particular service issue for a machine 104 more efficiently.

The service center computer system 112 receives notifications regarding the state and/or operation of the machines 104 through the automated planning system server 108 (e.g., notifications of a service issue associated with a machine 104). The service center computer system 112 also receives instructions or guidance for addressing particular service issues from the automated planning system server 108. For example, the automated planning system server 108 may provide instructions for a specific machine 104 that take into consideration the specific build and lay-out of the machine 104. Therefore, the exchange of information between the service center computer system 112 and the automated planning system server 108 improves the information received and provided by both systems. On one hand, the service center computer system 112 provides field service data to the automated planning system server 108, which improves the procedures developed by the automated planning system server 108. On the other hand, the automated planning system server 108 provides improved and focused procedures to the service center computer system 112, which increases the productivity and shortens the time needed to repair and/or conduct maintenance work on the machine 104.

During operation, the service center computer system 112 receives an indication of a service issue encountered by a machine 104, the service center then responds to the service issue and performs the desired or necessary service. In some embodiments, the service center computer system 112 receives an indication of desired and/or necessary service at one of the machines 104 from the automated planning system server 108. In such embodiments, the indication for desired and/or necessary service may be automatically generated by the automated planning system server 108 and may be received by the service center computer system 112 at approximately the same time that the automated planning system server 108 transmits the indication for desired and/or necessary service to a user (e.g., owner or responsible party) associated with the machine 104.

In some situations, the indication of a service issue originates from the machine 104 or a user associated with the machine 104. In such situations a user associated with the machine 104 contacts the service center, and the service center computer system 112 initiates communication with the automated planning system server 108, which then receives the indication of a service issue and accesses various types of information to determine an efficient manner to address the service issue. Additionally or alternatively, in some situations, the machine 104 may communicate directly with the service center computer system 112, which then forwards the information to the automated planning system server 108.

Figure 3:
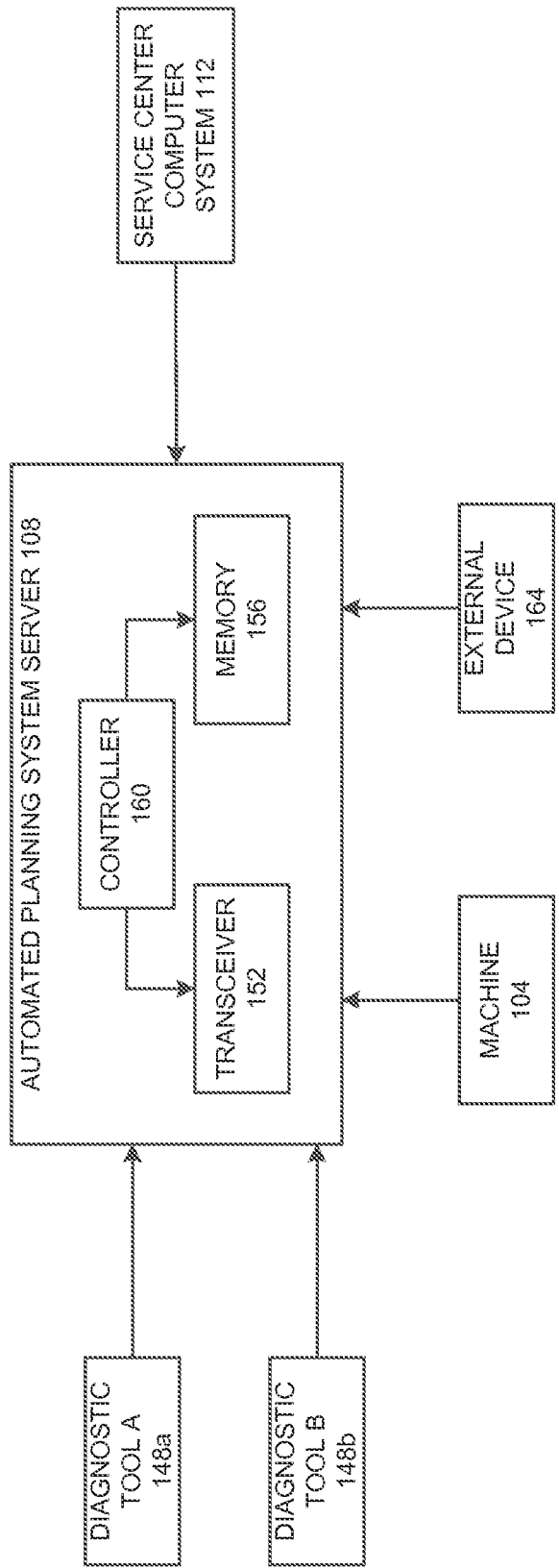
FIG. 3 is a schematic of a automated planning system server of the system of FIG. 1.

As shown in FIG. 3, the machine diagnostics system 100 also includes a plurality of diagnostic tools 148a-b. The diagnostic tools 148a-b are portable electronic devices that can be easily carried from one location to the next. The diagnostic tools 148a-b also provide a graphical user interface for the user (e.g., a person performing the service on the machine 104) to view instructions, and other information related to the service issue and the machine 104. The diagnostic tools 148a-b also include a communication unit configured to communicate with the automated planning system server 108. In the illustrated example, the communication unit includes an internet communication unit such that the diagnostic tools 148a-b communicate with the automated planning system server 108 using an Internet protocol. Each diagnostic tool 148 may also include other components such as, for example, a speaker, a microprocessor, a removable and/or rechargeable power source, communication ports to communicate with other external devices, etc. Furthermore, each diagnostic tool includes a non-transitory computer-readable memory.

As discussed further herein, the diagnostic tool can be configured to receive and store various data from the automated planning system server 101 prior to a service visit. This stored data can then be used by the diagnostic tool 148a-b to provide and adjust the step-by-step procedures to be performed during the service visit based on the outcome of various procedures performed by the technician on the machine during the service visit. In some embodiments, this stored information on the diagnostic tool is used particularly when the technician anticipated that he will not have a reliable Internet connection to communicate with the automated planning system server 108 during the service visit (e.g., during visits to remote or rural job sites).

As also shown in FIG. 3, the automated planning system server 108 includes a communication transceiver 152, a non-transitory computer-readable memory 156, and a controller 160. The transceiver 152 enables the automated planning system server 108 to communicate with various components of the machine diagnostics system 100, such as the machine 104 and the service center computer system 112. The transceiver 152 receives information from the machine 104 through the machine telematics system 132. Depending on the specific configuration of the machine 104, the machine telematics system 132 communicates various types of information to the server 108 including, for example, sensor data collected by the sensors 124 of the machine 104, location data from the position sensor 134 of the machine 104, build data (including information regarding specific model and serial numbers for different components of the machine 104), and other machine information including hardware configuration information and area/field of use information. Hardware configuration information includes, for example, information about connections between elements, location of parts or components, wiring diagrams, etc. Area of use information includes, for example, industry in which machine is used, application for the machine, and the like.

The automated planning system server 108 also receives, collects, and maintains other warranty and historical service information for each specific machine. In some implementations, this information is stored on the machine 104 itself and sent to the automated planning system server 108. However, in other implementations, warranty and historical service information is provided by service centers, repair/service technicians/facilities, machine dealers, and/or machine manufacturers. Historical service information includes, for example, previous repairs and/or replacements performed on the machine 104 (e.g., "field data" from previous service visits performed by the technician), and/or other services related to repair of the machine 104. In some implementations, the stored data on the automated planning system server 108 may also include information about the machine itself including, for example, hardware configuration, area/field of use, and model and serial numbers for the machine itself and any components that have been added or replaced during the life of the machine. This information may be provided to the automated planning system server 108 by various sources including, but not limited to, the machine itself.

In some embodiments, the automated planning system server 108 receives the build data and some of the machine information the first time the machine 104 communicates with the automated planning system server 108. Each subsequent connection, the machine 104 may only communicate changed values (e.g., sensor data and location data). In other embodiments, the server 108 may communicate with a manufacturer of the machine 104 to obtain the machine information, build data, and other pertinent information for the machine 104. A user associated with the machine 104 can also access the server 108 with an external device through, for example, a webpage. The user can then input the build data and/or the machine information into the server 108 through the webpage interface.

The server 108 also receives warranty information associated with specific machines 104. The warranty information may include, for example, a status of a warranty for the machine 104 as a whole and/or a list of components of the machine 104 with applicable warranty information for each listed component. The warranty information may also specify restrictions (e.g., expiration dates or conditions) for each of the components and their respective warranties. The server 108 can also obtain information regarding the user or owner associated with the specific machine 104. The owner or user information may be collected from the machine 104 or externally through an external device 164 (e.g., a computer, a smartphone, a personal digital assistant, etc.), or may be provided by a service center computer system 112 on a first connection regarding the machine 104.

Once the server 108 receives the information relevant to the machine 104, the server 108 stores the received information on the non-transient computer-readable memory 156. The controller 160 of the server 108 executes instructions stored on the non-transient computer-readable memory 156 that cause the server 108 (or a local technician service device, as discussed in further detail below) to access the machine-specific information stored on the memory 156 and to develop an optimized list of steps for procedures to be performed by a technician using the service center computer system 112 to resolve a particular service issue. In particular, the controller 160 is configured to access the memory 156 and identify, based on the stored data, a list of conditions relevant to the machine 104 or conditions that will be relevant during a time of service. Based on the list of conditions relevant to the machine 104, the controller 160 generates an ordered and optimized list of diagnostic procedures to be performed to address the identified service issue of the machine 104 in an efficient manner. The ordered list takes into consideration the conditions identified as being relevant to the machine 104, the user information, the build data, the machine information, the location information, and the sensor information. In some embodiments, the server 108 gives each of these pieces of information different weights in view of the conditions that are determined to be relevant to the machine 104.

Figure 4:
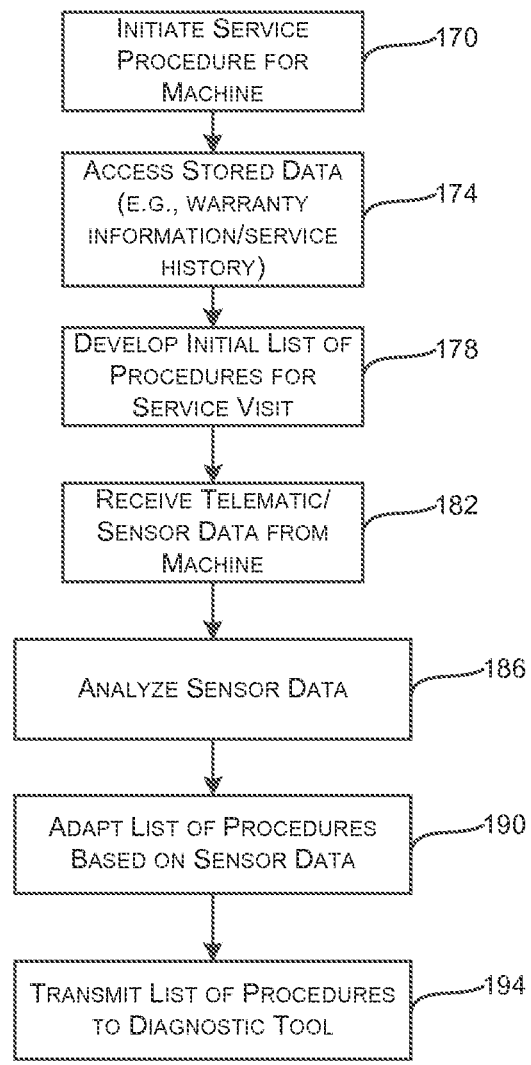
FIG. 4 is a flowchart illustrating a general operation of the machine diagnostics system of FIG. 1.

Once the server 108 generates the ordered list of diagnostic procedures, the server 108 communicates the ordered list to the diagnostic tool 148, the service center computer system 112, or both. A technician then uses the ordered list of diagnostic procedures to repair or provide maintenance for the machine 104 in an efficient manner. Furthermore, as the technician collects further data and performs various procedures on the machine 104, the ordered list of diagnostic procedures is further modified and adapted based on newly acquired information during the service visit, case-based reasoning techniques, and other rules applicable to the machine, the manufacturer, or the service center FIG. 4 is a flowchart illustrating a method implemented by the automated planning system server 108 to generate an optimized ordered list of diagnostic procedures using stored machine information and other collected machine data such as discussed above. First, the machine diagnostics system 100 initiates a service procedure for the machine (step 170). This service procedure might be initiated for several various reasons. For example, the operator or owner of the machine 104 may call to report a problem and to request service, the machine telematics system 132 may transmit information indicating a problematic condition to the system 100, or the machine 104 may simply require a regularly scheduled maintenance procedure as defined by the machine warranty information (or the historical service record for the machine).

When the service procedure is initiated, the server 108 accesses stored data from the memory 156 including, for example, warranty information, service history information, and machine make/model/configuration information (step 174). Based on this accessed vehicle information and the nature of the service procedure that has been initiated, the server 108 then develops an initial list of procedures for the upcoming service visit (step 178). The server 108 then requests sensor data or other telematics information from the machine 104 itself (or accesses such previously received data from the server memory 156) (step 182). The server 108 analyzes the data (step 186) and adapts the list of procedures based on the sensor data (step 190). The adaptation of the ordered list may include, for example, the addition or removal of specific steps/tests, changing the order in which certain steps are to be performed, or changing the weighting or importance assigned to specific tests procedures that will be performed by the service technician during the service visit. The adapted list of procedures is then transmitted to a diagnostic tool (step 194) that will be used by the technician during the service visit.

For some service procedures, the first step in the ordered list of procedures may include downloading a new or updated version of software for the machine either directly to the machine via the machine telematics system or to the diagnostic tool to be installed by the technician during the service visit. The initial list of ordered steps may also include collecting and analyzing certain specific information from the machine 104 or running various tests on the machine 104 while monitoring the response of the machine 104. Machines 104 equipped with telematics systems 132, for example, can enable the server 108 to collect this information prior to the service visit. By collecting this sensor data and applying various tests or rules to the collected data, the step-by-step procedures can be adapted and modified prior to the service visit. In this way, the technician can operate more efficiently during the service visit and, in the event that the pre-collected data confirms that new hardware components will be required to address a service issue, technician can order the necessary hardware components and bring them along to the service call. As such, the repair/replacement procedure can be performed during the initial service visit and a follow-up visit after on-site diagnosis might be avoided.

Also, as discussed above, as the steps of the procedures are performed by the technician during the service visit, the order and content of the ordered steps will continue to adapt. For a service visit conducted with Internet-connectivity, the diagnostic tool 148 used by the technician can continue to send additional information back to the server 108 during the service visit and the server 108 can continue to send updates to the step-by-step service procedure back to the technician. However, for a service visit conducted without reliable Internet-connectivity (e.g., at a remote construction or farm site), the diagnostic tool itself 148 can be configured to anticipate possible results of steps that will be performed by the technician during the service call such that the diagnostic tool 148 can modify the order of procedures displayed to the technician based on test results during the service call without requiring connectivity with the remote automated planning system server 108.

Figure 5:
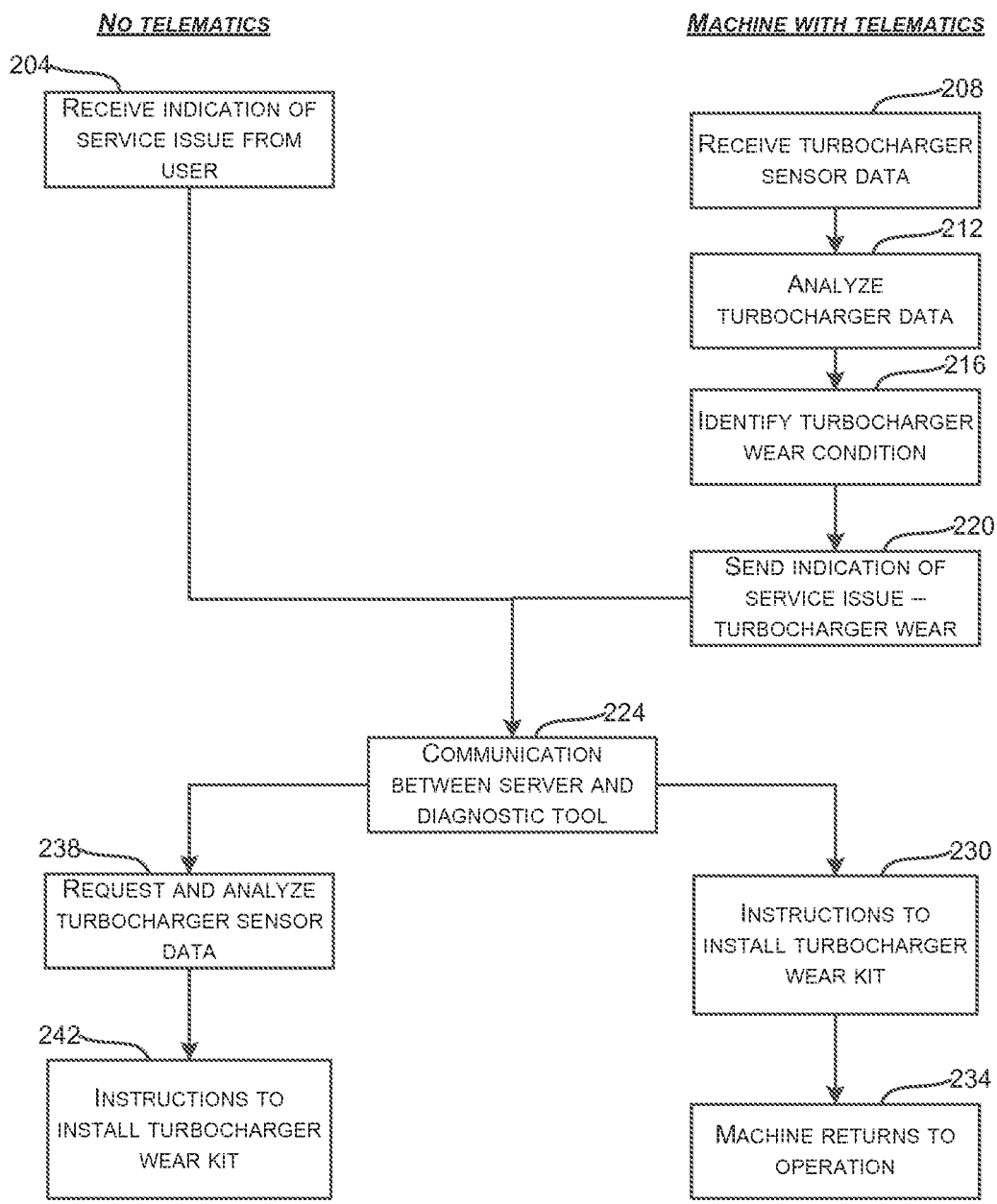
FIG. 5 is a flowchart illustrating an exemplary process implemented by the system of FIG. 1.

The flowchart shown in FIG. 5 is a more specific example of the procedure illustrated in FIG. 4. In particular, the example of FIG. 5 illustrates how the machine diagnostics system 100 might develop and implement a procedure for identifying a condition associated with wear of a turbocharger and how the procedure may change depending on whether the machine at issue is equipped with a telematics system 132. As shown in FIG. 5, the automated planning system server 108 can learn about a service issue in at least two different ways. First, a user associated with the machine 104 may notify the service center or the service center computer system 112 of a service issue such as, for example, an active fault code on the machine 104 (step 204).

Alternatively, if the machine 104 is equipped with a telematics system 132, the automated planning system server 108 will periodically receive information from the machine 104. The automated planning system server 108 receives the sensor data related to a turbocharger such as, for example, encoder counts, vane position, etc. (step 208). The automated planning system server 108 analyzes the turbocharger sensor data (step 212) to identify any conditions related to the turbocharger of the machine 104. The automated planning system server 108 may determine, for example, whether a calibration value associated with the turbocharger exceeds a threshold. In some embodiments, the automated planning system server 108 analyzes the sensor data by comparing the parameter value to a predetermined range, and determining whether a parameter value (e.g., a calibration value) is outside the predetermined range. The predetermined range may include an upper threshold, a lower threshold, or both. In step 216, the automated planning system server 108 identifies a turbocharger maintenance or wear condition of the machine 104. In other examples, when the sensor data does not refer to turbocharger parameter data, the automated planning system server 108 identifies an abnormal condition when the parameter value is outside the predetermined range. In the illustrated embodiment, the automated planning system server 108 sends an alert to service center computer system 112 indicating that the machine 104 is associated with a turbocharger wear condition (step 220).

In some embodiments, identification of the turbocharger wear condition triggers the automated planning system server 108 to activate a turbocharger fault code, and the turbocharger fault code is transmitted to the service center computer system 112. Therefore, when the machine 104 includes a machine telematics system 132, diagnosis of a particular service issue is faster (since the sensor data is analyzed periodically) instead of waiting for a fault code to be activated at the machine 104. In fact, in some embodiments, the service and repair facility initiate communication with the user associated with the machine 104 indicating that maintenance is needed before the user realizes that the machine 104 needs maintenance. In some embodiments, the thresholds used by the server 108 may be lower than those used at the machines 104 such that a potential service issue for the machine 104 is detected at the server 108 faster than it would be detected by the machine 104 itself.

Once the service center computer system 112 has been alerted of a service issue, either through communication with a user or through the automated planning system server 108, the server 108 communicates with one of the diagnostic tools 148 (step 224). A technician associated with the service center, using one of the diagnostic tools 148 travels to the location of the machine 104 and performs service on the machine 104. The diagnostic tool 148 can operate in an online mode and in an offline mode. During an online mode, the diagnostic tool 148 remains in communication with the server 108. The server 108 can then provide the list of diagnostic procedures to be implemented by the technician while the technician is at the location of the machine 104. In the offline mode, however, the diagnostic tool 148 downloads processing files prior to traveling to the location of the machine 104. The files downloaded to the diagnostic tool 148, however, enable the identification of conditions associated with the machine and the generation of the ordered list of diagnostic procedures to follow.

In the illustrated embodiment, different diagnostic procedures are performed based on whether the machine 104 is equipped with the machine telematics system 132. If the machine 104 includes the machine telematics system 132, some of the sensor data has already been sent to the automated planning system server 108. In the illustrated embodiment, the diagnostic tool 148 displays a list of ordered diagnostic procedures for the technician to follow. Since the automated planning system server 108 already determined that the wear on the turbocharger exceeds a threshold, one of the steps in the list of diagnostic procedures includes installing a turbocharger wear kit (step 230). The turbocharger wear kit may include parts that help alleviate the wear of the turbocharger such as, for example, new seals or rings. The turbocharger wear kit may additionally or alternatively inhibit further wear of the turbocharger. If no other service issues are related to the machine 104, the technician finishes the installation of the turbocharger wear kit and the machine 104 returns to operation (step 234).

If, however, the machine 104 is not equipped with machine telematics system 132, the list of diagnostic procedures to be followed by the technician (because the automated planning system server 108 did not identify the turbocharger wear condition) is different than the list discussed above. In particular, if the machine 104 does not include the machine telematics system 132, the first diagnostic procedure on the diagnostic tool 148 instructs the technician to request turbocharger sensor data from the machine 104 and allow the automated planning system server 108 to analyze the turbocharger sensor data (step 238)—steps that would have been performed automatically by the server 108 prior to the service call if telematics data were available. After the analysis, the step-by-step procedures may indicate that a turbocharger wear kit needs to be installed (step 242). However, because this instruction is not generated until the technician reaches the machine site during the service visit, the technician may not have the necessary parts and tools to install the turbocharger wear kit. A follow-up service visit would need to be scheduled and the machine's return to operation may be further delayed. As illustrated in the process shown in FIG. 5, a machine 104 including machine telematics system 132 can return to operation faster than a machine 104 without the machine telematics system 132 because the machine telematics system 132 allows the automated planning system server 108 to analyze the sensor data prior to the technician traveling to the machine and/or performing repair on the machine 104.

Figure 6:
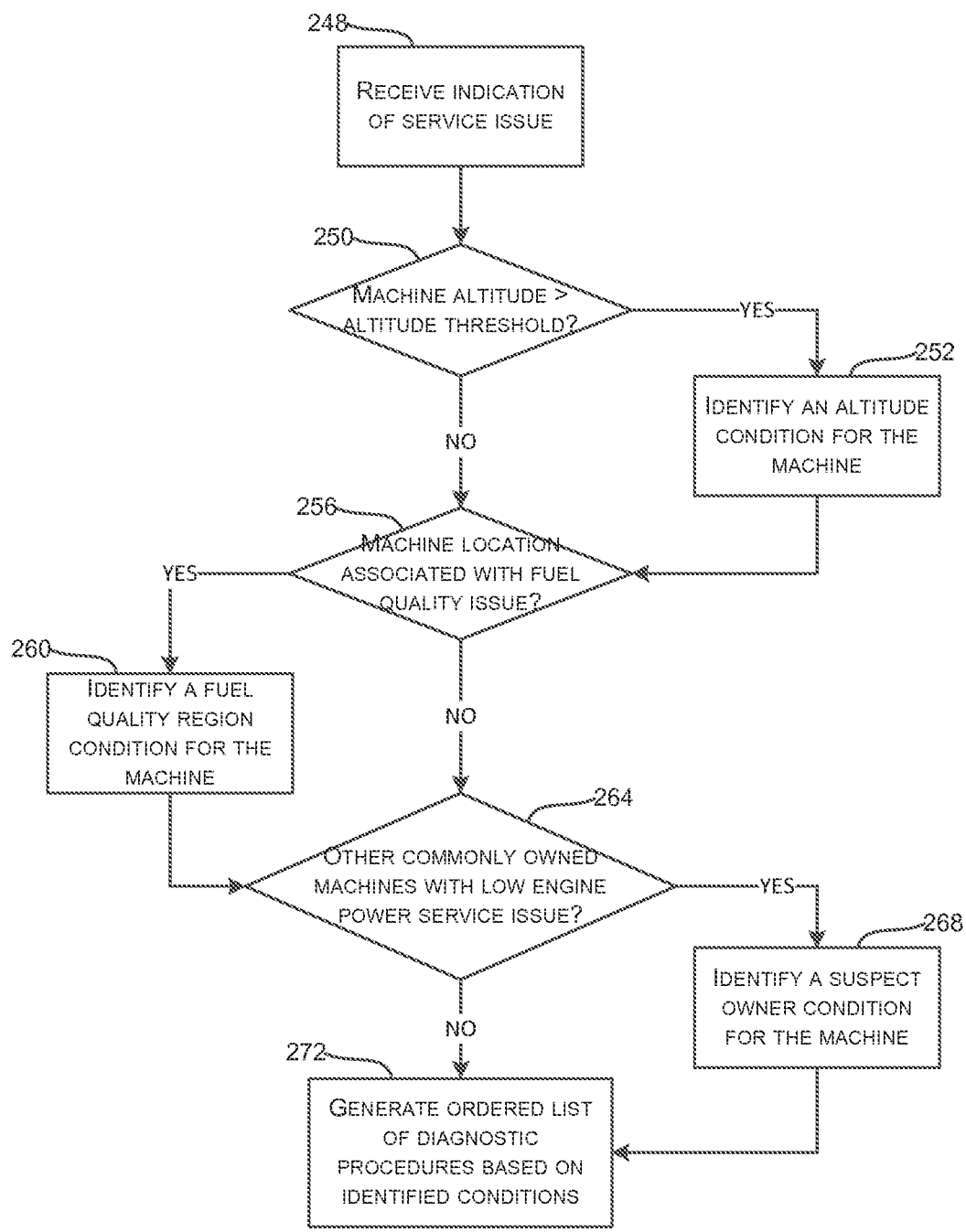
FIG. 6 is a flowchart illustrating a second exemplary process implemented by the system of FIG. 1.

FIG. 6 illustrates a flowchart for another example of a preparing an ordered list of steps using the machine diagnostics system 100. This particular example relates to utilizing machine location information to more fully understand some of the service issues experienced by the machine 104. In particular, the machine 104 for this example may include an engine that receives fuel and that is currently experiencing a low engine power service issue. The automated planning system server 108 receives the indication of the service issue, for example, by an active diagnostic trouble code (DTC) being communicated to the server 108 or by the operator of the machine reporting an observed issue to the service center (step 248). The automated planning system server 108 identifies any conditions related to the machine 104 based, in particular, on geographic information of the machine 104 (i.e., the location of the machine 104). The automated planning system server 108 receives the location sensor data (i.e., the position) of the machine 104 and analyzes the sensor data to identify potential conditions related to the machine 104.

In the illustrated embodiment, the automated planning system server 108 determines whether the location of the machine 104 has an altitude greater than a predetermined altitude threshold (step 250). If the altitude of the machine at the location is greater than the predetermined altitude threshold, the automated planning system server 108 identifies an altitude condition for the machine 104 (step 252). The altitude condition, in the illustrated embodiment, may be indicative of a potential air density issue. If the altitude of the machine 104 at the location is not greater than (i.e., is less than or equal to) the predetermined altitude threshold, the automated planning system server 108 does not identify the altitude condition as being associated with the machine 104.

The automated planning system server 108 also analyzes the location data of the machine 104 (step 256) to determine whether the location of the machine is associated with a fuel quality issue and may, therefore, identify a fuel quality region condition of the machine 104 (step 260). The automated planning system server 108 may determine that certain regions may be associated with a fuel quality issue based on for example, the field service data in those particular regions. If the automated planning system server 108 identifies a fuel quality region condition for the machine 104, the automated planning system server 108 provides an indication that the region of machine 104 is suspected to have fuel quality issues, and may provide solutions for alleviating the problem of fuel quality (e.g., obtaining fuel from a different region).

In the illustrated embodiment, the automated planning system server 108 also identifies any conditions of the machine 104 based on the warranty information. As shown in FIG. 6, the automated planning system server 108 determines whether other machines 104 associated with the same owner or user also indicate having a low engine power service issue (step 264). If the automated planning system server 108 determines that the same user or owner is associated with a plurality of machines 104 reporting a low engine power user, the automated planning system server identifies a suspect owner condition (step 268).

Once the sensor data has been analyzed to identify potential conditions for the machine 104, the automated planning system server 108 generates an ordered list of diagnostic procedures based on the service issue, in this example, the low engine power, and based on the identified conditions (step 272). The ordered list of diagnostics procedures is optimized such that the automated planning system server 108 takes into consideration the specific conditions identified with the machine 104 and the diagnostics procedures normally followed given a particular service issue (e.g., a default procedure). Based on the conditions identified, the ordered list of procedures may be slightly different. For example, if the suspect owner condition was identified as being associated with the machine 104, the diagnostic procedures may include a step that verifies suspect owner expectations earlier than the default procedure, and/or earlier than the diagnostics procedures would have shown had other conditions been identified for the machine 104. As discussed previously with respect to the turbocharger condition, when the machine 104 includes the machine telematics system 132, the automated planning system server 108 analyzes sensor data and identifies conditions for the machine 104 before traveling to the machine's location for servicing, such that any parts or necessary tools may be taken by the technician in preparation.

Figure 7:
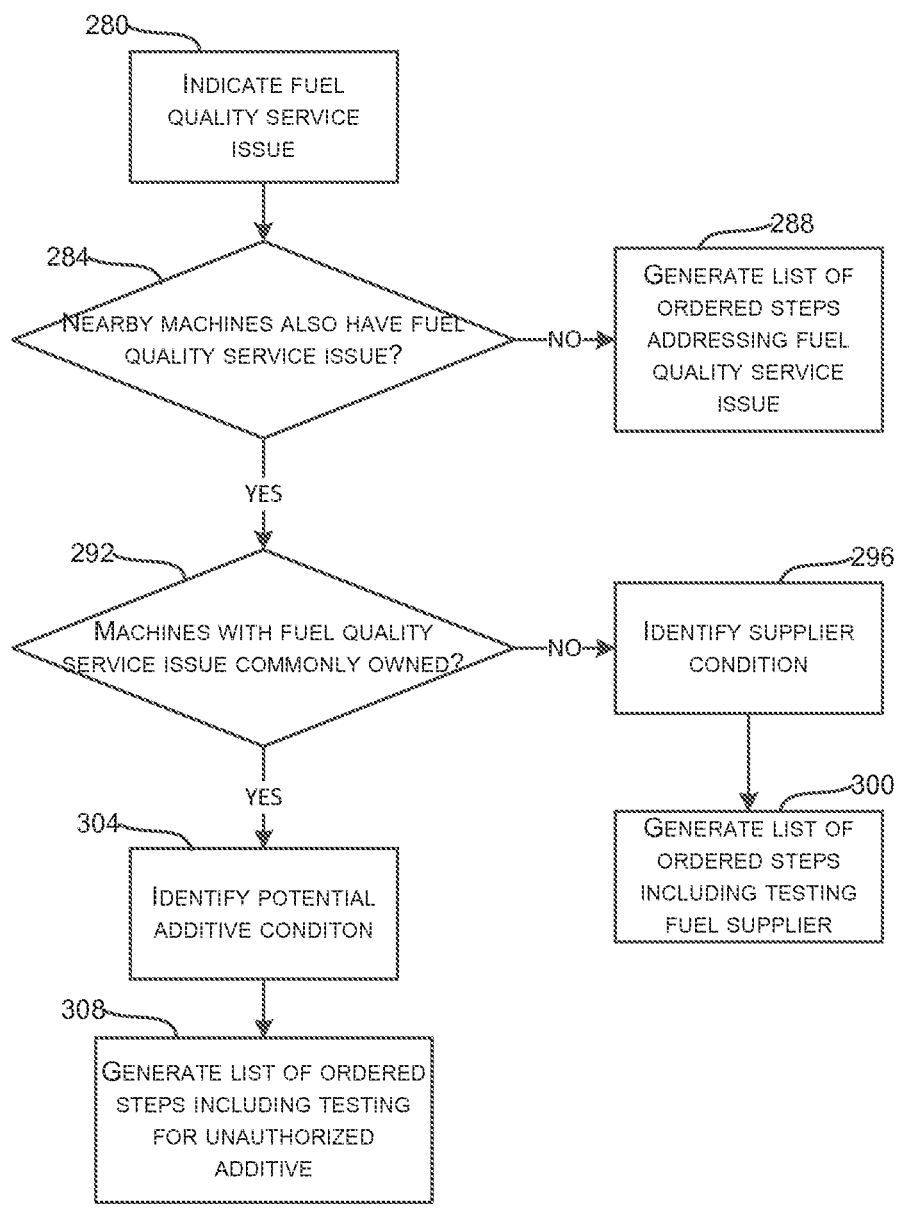
FIG. 7 is a flowchart illustrating a third exemplary process implemented by the system of FIG. 1.

FIG. 7 illustrates another example of the automated planning system server 108 identifying machine 104 conditions and generating the ordered list of diagnostic procedures accordingly. In the example of FIG. 7, the machine 104 indicates a fuel quality issue by, for example, indicating that a fuel quality fault code is active (step 280). Alternatively, the operator of the machine 104 may report an observed condition indicative of a fuel quality issue. The automated planning system server 108 analyzes the machine's positional sensor data (i.e., the position of the machine 104) and determines whether other machines 104 near the position of the machine with the fuel quality service issue also indicate having a fuel quality service issue (step 284), the automated planning system server 108 also determines whether the machines within the same region that indicate having a fuel quality service issue are associated with the same user (e.g., owner) (step 292). If the automated planning system server 108 determines that additional machines within the same area indicate having fuel quality issues, but these machines 104 are not associated with the same user, the automated planning system server 108 identifies a supplier condition (step 296) and generates a list of ordered diagnostic procedures that include steps for testing whether the fuel supplier is providing low quality fuel (step 300).

If, on the other hand, the automated planning system server 108 determines that a plurality of machines 104 in the same area are experiencing fuel quality service issues, and the machines 104 are all, or mostly, associated with the same user, the automated planning system server 108 identifies a potential additive condition (step 304) and generates a list of diagnostics procedures that include steps for testing whether the fuel includes an unauthorized additive, most likely added by the user (step 308).

As illustrated in FIG. 7, the list of ordered diagnostic procedures generated by the automated planning system server 108 is different based on the conditions identified by the automated planning system server 108. In other words, the automated planning system server 108 generates a first ordered list of diagnostic procedures if one set (e.g., list) of conditions are identified with the machine 104, but generates a different list of ordered diagnostic procedures if a different set of conditions are identified with the machine 104. Therefore, the automated planning system server 108 optimizes the known conditions associated with the machine 104 as well as the identified service issue to most efficiently return the machine 104 to normal operation.

Figure 8:
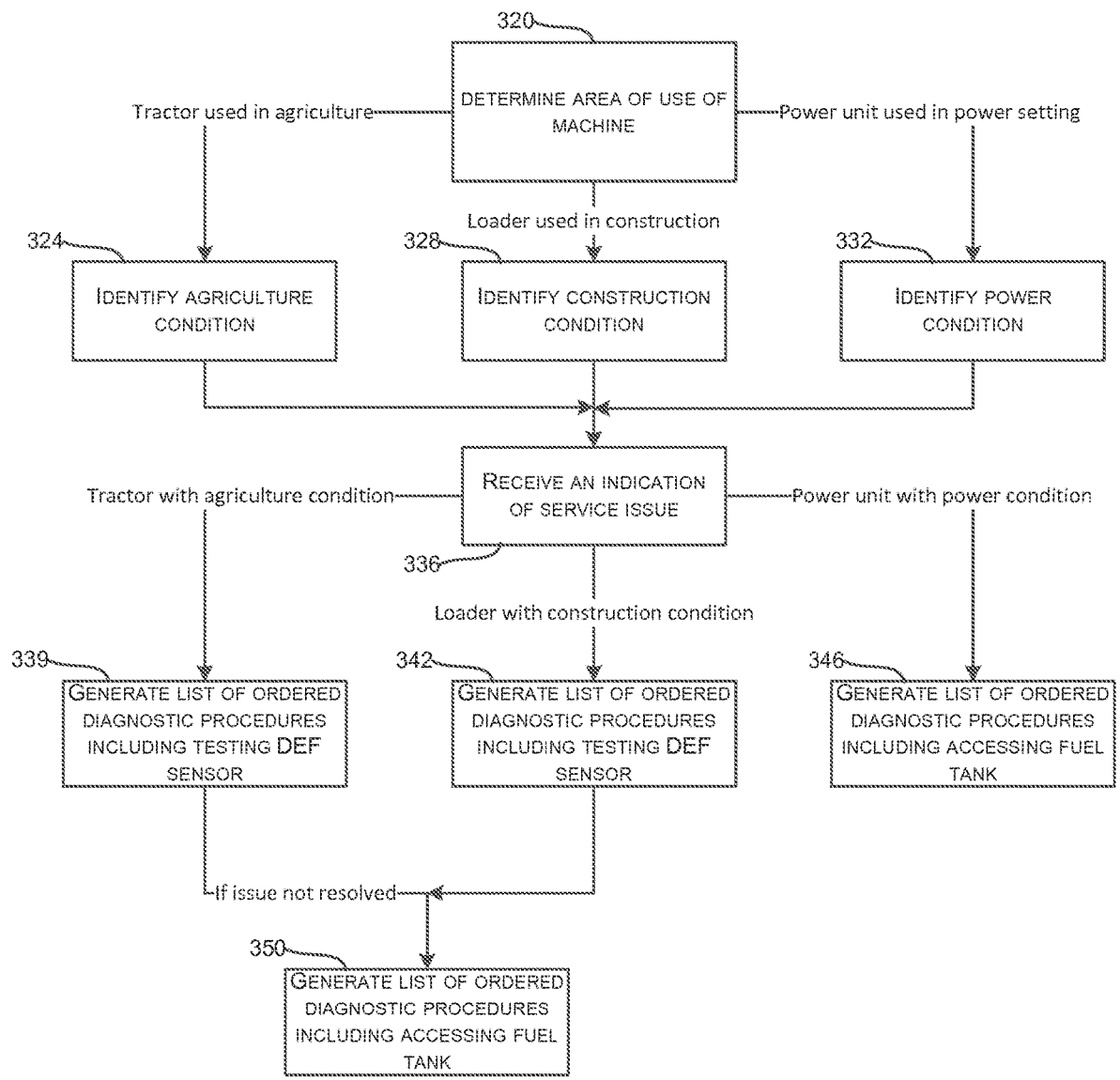
FIG. 8 is a flowchart illustrating a fourth exemplary process implemented by the system of FIG. 1.

FIG. 8 illustrates another example of the operation of the machine diagnostics system 100. As shown in FIG. 8, the automated planning system server 108 receives or accesses machine data associated with the machine 104 and analyzes the machine data to identify any conditions of the machine 104 based on the machine data. In this particular example, the automated planning system server 108 identifies an area of use condition of the machine 104. The automated planning system server 108 determines based on the machine information whether the machine 104 is used in a construction, agriculture, or power area of use (step 320). In other embodiments the automated planning system server 108 may include other areas of use to associate with the machine 104. For example, the automated planning system server 108 may additionally or alternatively determine whether the machine 104 is used for regular consumer-level landscaping. Based on the area of use of the machine 104, the automated planning system server 108 identifies the associated condition with the machine 104 (steps 324-332). If, for example, the machine 104 operates in an agricultural environment, the automated planning system server 108 identifies an agriculture use condition for the machine 104 (step 324). The automated planning system server 108 also identifies the particular machine 104 based on the machine data. The automated planning system server 108 then receives an indication of the service issue with the machine 104 (step 336).

In the illustrated embodiment, the loader, tractor, and power unit machines 104 experience a Diesel Exhaust Fluid (DEF) service issue. Once the service issue and the conditions of the machine 104 are identified, automated planning system server 108 generates an ordered list of diagnostic procedures to follow based on the specific conditions, service issue, and machine configuration associated with the machine 104 (steps 339-346). For example, as illustrated in FIG. 8 the same engine system may be implemented in a tractor used for agriculture, a power unit, and a loader used in construction. All three machines would trigger the same diagnostic trouble code in response to an abnormal pressure in the DEF system. The pressure condition of the DEF system can be properly analyzed by accessing the DEF header. For the tractor and the power unit, this might be a fairly straightforward procedure. However, for the loader, accessing the DEF header may require complicated disassembly of the system which can take several hours. As such, it may be more efficient to perform other intermediate diagnostic steps to attempt to resolve the DTC code before resorting to disassembly of the loader.

Therefore, as illustrated in FIG. 8, the automated planning system server 108 generates an ordered list of diagnostic procedures for the tractor that begins with the step of accessing the DEF header (step 339). Similarly, the ordered list of diagnostic procedures generated for the power unit in response to the same DTC code also begins with accessing the DEF header (step 342). However, in response to the same DTC code, the automated planning system server 108 generates an ordered list of diagnostic procedures for the loader that begins with one or more other intermediate diagnostic steps (step 346) that will attempt to resolve the issue before requiring disassembly of the loader to access the DEF header. According to the ordered list that is automatically generated for the loader, the technician is to attempt to access the DEF header to address the DEF pressure issue only if the other intermediate diagnostic steps are inconclusive (step 350).

Figure 9:
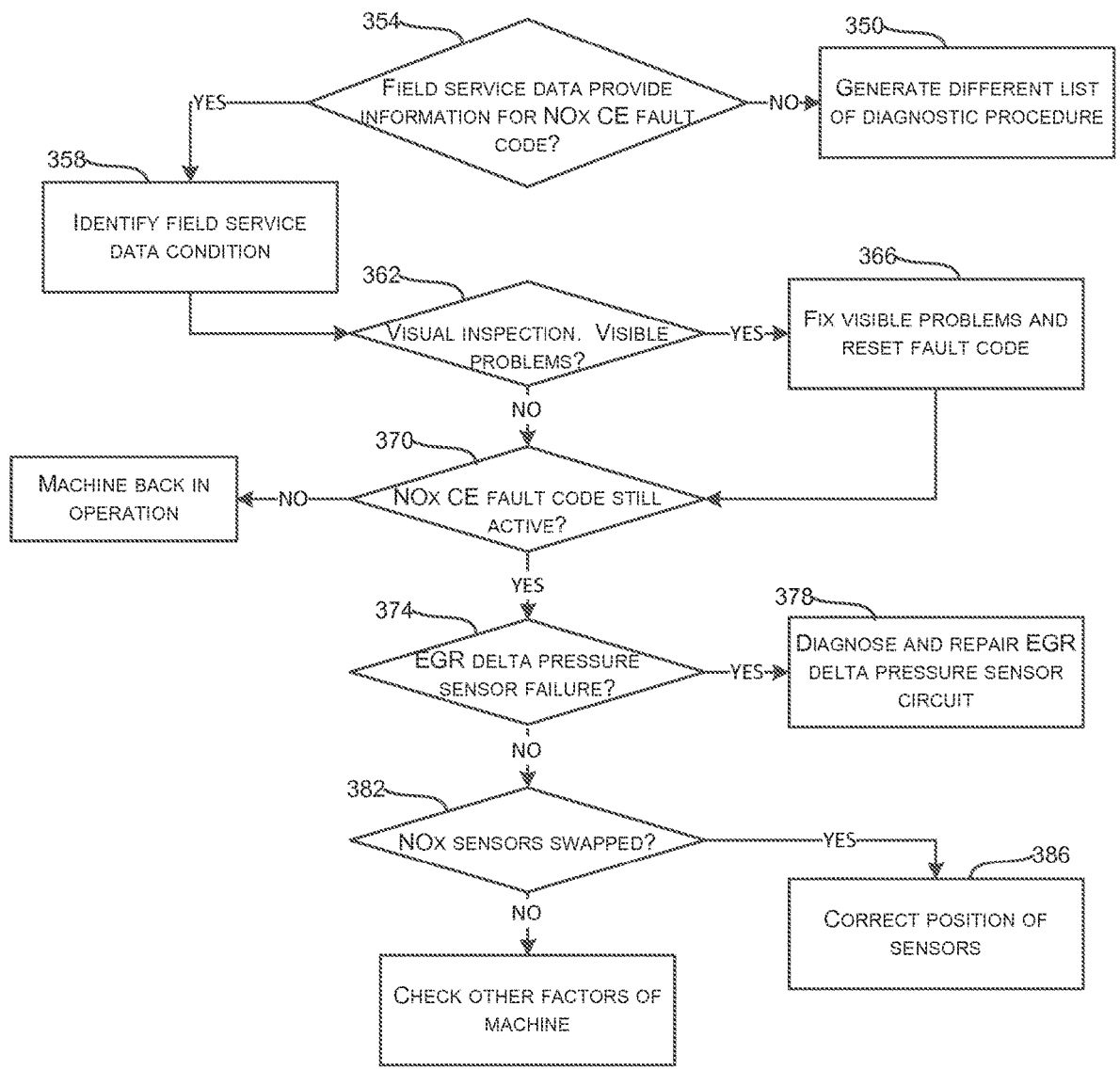
FIG. 9 is a flowchart illustrating a fifth exemplary process implemented by the system of FIG. 1.

FIG. 9 illustrates another example of the operation of the machine diagnostics system 100. In the illustrated embodiment, an oxides of nitrogen conversion efficiency (NOx CE) fault code is active. The automated planning system server 108 determines whether the field service data provides any significant information regarding this type of fault code (step 354). In the illustrated embodiment, the field service data indicates that replacing an EGR delta pressure sensor resolves the NOx CE fault code more often than testing if the NOx sensors are swapped. Accordingly, the automated planning system server 108 identifies a field service data condition with the machine 104 (step 358). In the illustrated embodiment, the automated planning system server 108 generates an ordered list of diagnostic procedures taking into consideration the field data condition of the machine 104. The list of diagnostic procedures includes performing a visual inspection of the exhaust system (step 362) and performing repair if any physical issues are found (step 366). The list of procedures then indicates checking if the NOx CE fault code is still active (step 370) and, if the NOx CE fault code is still active, testing the EGR delta pressure sensor circuit (step 374). If a failure is detected in the EGR delta pressure sensor circuit, the EGR sensor circuit is diagnosed and repaired (step 378). If, on the other hand, the EGR delta pressure sensor circuit does not indicate any failure, the diagnostic procedures indicate to test if the NOx sensors are swapped (step 382). If the NOx sensors are swapped, the technician is instructed to change the position of the NOx sensors (step 386).

The flowchart of FIG. 9 illustrates how knowledge about the field service data can re-arrange the steps included in the list of diagnostics procedures to address the most common solutions to particular service issues. In the embodiment illustrated in FIG. 9, without access to the field service data, the step of testing for swapped NOx sensors would come earlier (i.e., before) testing the EGR delta pressure sensor. Therefore, the conditions identified for the machine 104 allow the automated planning system server 108 to more efficiently address the service issues with each machine 104.

Thus, the invention provides, among other things, a method of using machine data, sensor data, and identified conditions with a machine to optimize a set of diagnostic procedures to address particular service issues with the machine 104. Various features and advantages of the invention are set forth in the following claims.

What is claimed is:

1. A machine diagnostics system used for monitoring and servicing a machine using a machine telematics system, the machine diagnostics system comprising:
   a communication transceiver configured to receive from the machine telematics system sensor data recorded during routine operation of a first machine of a plurality of monitored machines by sensors equipped on the first machine;
   a non-transitory computer-readable memory storing machine information for the plurality of monitored machines and received sensor data from the first machine, the machine information including at least one from a group consisting of hardware configuration information, area of use information, and historical service information for each of the plurality of machines;
   an automated planning system server coupled to the non-transitory computer-readable memory and the communication transceiver, the automated planning system server configured to
      receive an indication of a service issue for the first machine of the plurality of machines;
      automatically analyze the stored sensor data for the first machine,
      automatically generate a list of identified conditions for the first machine based at least in part on the analysis of the sensor data for the first machine,
      automatically generate an ordered list of diagnostic procedures to be performed during a servicing of the first machine to address the indicated service issue, wherein the ordered list includes a plurality of diagnostic procedures to address the indicated service issue, and wherein the automated planning system server is configured to generate the ordered list of diagnostic procedures by arranging the diagnostic procedures of the plurality of diagnostic procedures in a prioritized order based at least in part on the stored machine information for the first machine and the identified conditions of the first machine,
      wherein the automated planning system is further configured to automatically generate a second ordered list of diagnostic procedures to be performed during a separate service call for a second machine of the plurality of machines by arranging the plurality of diagnostic procedures in a different prioritized order based on the stored machine information for the second machine and not based on any measured data received from any machine telematics system for the second machine, wherein the second machine is not equipped with a machine telematics system of the second machine.

2. The machine diagnostics system of claim 1, wherein the automated planning system server is further configured to
automatically generate the ordered list of diagnostic procedures to be performed during the servicing of the first machine to address the indicated service issue while a portable device used for servicing the first machine is at a location that is remote from a location of the first machine,
transmit the generated ordered list of diagnostics procedures to the portable device while the portable device is at the location that is remote from the location of the first machine, and
display the ordered list of diagnostic procedures on the portable device while the portable device is at the location of the first machine.

3. The machine diagnostics system of claim 1, wherein the automated planning system server is further configured to
automatically generate the ordered list of diagnostic procedures to be performed during the servicing of the first machine while a portable device used for servicing the first machine is at a location of the first machine, and
transmit the generated ordered list of diagnostic procedures to the portable device while the portable device is at the location of the first machine.

4. The machine diagnostics system of claim 1, wherein the automated planning system server is further configured to automatically generate the ordered list of diagnostic procedures in response to receiving, through the communication transceiver, the indication of the service issue for the first machine, wherein the indication of the service issue identifies an active fault code for the first machine.

5. The machine diagnostics system of claim 1, wherein the automated planning system server is further configured to automatically generate a second list of identified conditions for the first machine based on the historical service information for the first machine stored on the non-transitory computer-readable memory, wherein the historical service information includes previous service issues and corresponding resolving procedures for the first machine, and wherein the ordered list of diagnostics procedures is optimized to address the indicated service issue based on the stored machine information for the first machine, the first list of identified conditions of the first machine based on the analysis of the sensor data for the first machine, and the second list of identified conditions of the first machine based on the machine information for the first machine.

6. The machine diagnostics system of claim 1, wherein the automated planning system server is further configured to automatically generate a second list of identified conditions for the first machine based on the area of use information for the first machine stored on the non-transitory computer-readable memory, and wherein the ordered list of diagnostics procedures is optimized to address the indicated service issues based on the stored machine information for the first machine, the first list of identified conditions of the first machine based in the analysis of the sensor data for the first machine, and the second list of identified conditions of the first machine based on the area of use for the first machine.

7. The machine diagnostics system of claim 1, wherein the sensor data includes a parameter associated with an operation of the first machine, and wherein the automated planning system server is configured to analyze the sensor data by comparing the parameter with a corresponding predetermined range, and wherein the list of identified conditions includes a parameter condition indicative of the parameter being outside the corresponding predetermined range.

8. The machine diagnostics system of claim 1, wherein the communication transceiver is further configured to transmit an identification of the indicated service issue for the first machine and the ordered list of diagnostic procedures to a service center computer system.

9. The machine diagnostics system of claim 1, wherein the automated planning system server is configured to arrange the diagnostic procedures of the plurality of diagnostic procedures in a prioritized order by
identifying one or more diagnostic procedures of the plurality of diagnostic procedures with the greatest chance for successfully resolving the indicated service issue, and
positioning the identified one or more diagnostic procedures at a front of the ordered list of diagnostic procedures.

10. The machine diagnostics system of claim 1, wherein the plurality of diagnostic procedures in the ordered list of diagnostic procedures includes a data gathering procedure, and wherein the automated planning system server is further configured to adjust a relative position of at least one other diagnostic procedure in the ordered list of diagnostic procedures based on data collected during the data gathering procedure.

11. A method for monitoring and servicing a machine using a machine telematics system, the method comprising:
storing, on a non-transitory computer-readable memory, machine information for a plurality of monitored machines, the machine information including at least one from a group consisting of hardware configuration information, area of use information, and historical service information for each of the plurality of machines;
receiving, by an automated planning system server, from machine telematics systems equipped on one or more individual machines of the plurality of machines, sensor data recorded during routine operation of the one or more individual machines by sensors equipped on the one or more individual machines;
storing the received sensor data on the non-transitory computer-readable memory;
receiving, by an automated planning system server, an indication of a service issue for a first machine of the plurality of machines;
automatically analyzing, by the automated planning system server, the sensor data for the first machine stored on the non-transitory computer-readable memory;
automatically generating, by the automated planning system server, a list of identified conditions for the first machine based at least in part on the analysis of the sensor data for the first machine;
automatically generating, by the automated planning system server, an ordered list of diagnostic procedures to be performed during a servicing of the first machine to address the indicated service issue, wherein the ordered list includes a plurality of diagnostic procedures to address the indicated service issue, and wherein generating the ordered list of diagnostic procedures includes arranging the diagnostic procedures of the plurality of diagnostic procedures in a prioritized order based at least in part on the stored machine information for the first machine and the identified conditions of the first machine; and automatically generating, by the automated planning system serve, a second ordered list of diagnostic procedures to be performed during a separate service call for a second machine of the plurality of machines by arranging the plurality of diagnostic procedures in a different prioritized order based on the stored machine information for the second machine and not based on any measured data received from any machine telematics system for the second machine, wherein the second machine is not equipped with a machine telematics system of the second machine.

12. The method of claim 11, wherein automatically analyzing the sensor data for the first machine includes comparing a parameter associated with an operation of the first machine with a predetermined range, and wherein automatically generating a list of identified conditions for the first machine includes identifying an abnormal condition for the first machine based on the parameter being outside the predetermined range.

13. The method of claim 11, wherein automatically analyzing the sensor data for the first machine includes analyzing a parameter associated with wear of a turbocharger, and wherein the list of identified conditions includes a turbocharger maintenance condition, and wherein automatically generating an ordered list of diagnostic procedures to be performed during a servicing of the machine includes generating the ordered list of diagnostic procedures including a step of performing preventative maintenance on the turbocharger.

14. The method of claim 11, wherein the step of generating the list of identified conditions for the first machine includes generating the list of identified conditions for the first machine based on the analysis of the sensor data for the first machine while the first machine is at a first location that is remote from a server location of the automated planning system server.

15. The method of claim 14, wherein the step of automatically generating the ordered list of diagnostics procedures to be performed during the servicing of the first machine to address the indicated service issue includes automatically generating the ordered list of diagnostic procedures to be performed during the servicing of the first machine while the first machine is at the first location that is remote from the server location of the automated planning system server.

16. The method of claim 11, wherein the indication of the service issue for the first machine identifies an active fault code for the first machine.

17. The method of claim 11, wherein storing machine information for the plurality of monitored machines includes
determining a first area of use for the first machine,
storing the first area of use as the area of use for the first machine,
receiving an area of use indication indicating a change of the area of use for the first machine from the first area of use to a second area of use, and
storing the second area of use as an updated area of use for the first machine,
wherein automatically generating the ordered list of diagnostic procedures to be performed during the servicing of the first machine to address the indicated service issue includes
generating the ordered list of diagnostic procedures based on the first area of use when the machine information indicates that the area of use for the first machine is the first area of use, and generating a third ordered list of diagnostic procedures based on the second area of use when the machine information indicates that the area of use for the first machine is the second area of use, wherein the first ordered list of diagnostic procedures is different than the third ordered list of diagnostic procedures.

18. The method of claim 11, wherein the machine information stored on the non-transitory computer-readable memory for the first machine includes historical repair information for the first machine, the historical repair information including previous service issues and corresponding solving procedures for the first machine,
wherein automatically generating the ordered list of diagnostics procedures to be performed during the servicing of the first machine to address the indicated service issue includes changing a relative position of at least one diagnostic procedure in the ordered list of diagnostic procedures based on the historical repair information for the first machine.

19. The method of claim 11, further comprising transmitting the indication of service issue for the first machine and the ordered list of diagnostic procedures to a service center computer system.

20. A machine diagnostics system used for monitoring and servicing a machine, the machine diagnostics system comprising:
a communication transceiver configured to receive, from a machine telematics system equipped on a first machine of a plurality of monitored machines, sensor data recorded during routine operation of the first machine;
a non-transitory computer-readable medium configured to
store warranty information for each machine of the plurality of monitored machines, and
store the received sensor data from the machine telematics system of the first machine; and
an automated planning system server coupled to the communication transceiver and the non-transitory computer-readable medium, the automated planning system server configured to
automatically generate a first ordered list of diagnostic procedures to be performed during a service call for the first machine by arranging a plurality of diagnostic procedures in a prioritized order based on the stored warranty information and the stored sensor data for the first machine, and
automatically generate a second ordered list of diagnostic procedures to be performed during a separate service call for a second machine of the plurality of machines by arranging the plurality of diagnostic procedures in a different prioritized order based on the stored warranty information for the second machine and not based on any measured data received from any machine telematics system for the second machine, wherein the second machine is not equipped with a machine telematics system of the second machine.

21. The system of claim 20, wherein the non-transitory computer-readable medium is further configured to store field service data including information regarding service issues and corresponding resolving procedures, wherein the field service data is gathered from various service center computer systems, and wherein the first ordered list is optimized to address the indicated service issue based on stored machine information, the stored field service data, and identified conditions of the first machine based on the warranty information and the analysis of the sensor data for the first machine.

* * * * *